Nov. 27, 1962  L. W. GOLDBERG  3,065,950
HERMETICALLY SEALED BUTTERFLY POPPET VALVE
Filed Jan. 17, 1961  2 Sheets-Sheet 1

INVENTOR.
LLOYD W. GOLDBERG
BY
AGENT

Nov. 27, 1962 L. W. GOLDBERG 3,065,950
HERMETICALLY SEALED BUTTERFLY POPPET VALVE
Filed Jan. 17, 1961 2 Sheets-Sheet 2

INVENTOR.
LLOYD W. GOLDBERG
BY
AGENT

United States Patent Office 3,065,950
Patented Nov. 27, 1962

3,065,950
HERMETICALLY SEALED BUTTERFLY
POPPET VALVE
Lloyd W. Goldberg, Clifton, N.J., assignor to Thiokol Chemical Corporation, Bristol, Pa., a corporation of Delaware
Filed Jan. 17, 1961, Ser. No. 83,230
2 Claims. (Cl. 251—160)

This invention relates in general to valves and has particular reference to the hybrid butterfly-poppet type of valve employed to control the flow in large capacity fluid conduits.

For the intended use, a combination butterfly-poppet valve affords the inherent advantages of both the butterfly type valve and the poppet type. Both types, when open, partially obstruct the flow passage of a valve body with varying degrees of retardation of fluid flow, but the butterfly valve is less objectionable in this respect than the poppet valve because it provides a greater degree of clearance, when open, and permits a greater extent of undeflected axial flow with correspondingly less turbulence and flow resistance. On the other hand, the poppet valve has the advantage over the butterfly valve of providing a reasonable tight non-hermetic seal with substantially complete shut-off, in the closed position, whereas the common butterfly valve is inherently incapable of effecting a preferably fluid-tight seal. Moreover, a poppet valve is readily adaptable to the addition of a shearable hermetic sealing element.

However, a butterfly-poppet valve requires two-stage actuating mechanism. In its excursions away from and toward its annular seat in the valve body, the circular valve member must be guided in truly rectilinear movement coaxial to the valve seat in a first stage wherein accurately graduated determination of the rate of fluid flow may be effected by varying the area of the annular orifice in the region of the valve seat. In the coordinated second stage, the valve member is rotated, or swung, into or out of fully open position in which it is laterally displaced from the axis of the flow passage and is arranged with the plane thereof parallel to said axis.

Prior to my present invention, efforts to achieve successful sequential two-stage movements of a butterfly-poppet valve have led to the development of complicated, bulky actuating mechanisms that are expensive to manufacture, likely to get out of order, and difficult to maintain in operating condition. Moreover, due to their bulk, these mechanisms present undesirable obstructions to fluid flow.

It, therefore, is the primary object of my invention to provide actuating means for a butterfly-poppet valve which will efficiently perform the required sequential two-stage movements in a highly efficient manner and yet comprises very few parts which are of simple construction.

Another object is to combine an effective shearable hermetic sealing element with a butterfly-poppet valve.

Still further objects, advantages and features will become apparent as the following specific description is read in connection with the accompanying drawing, in which.

Figure 1:
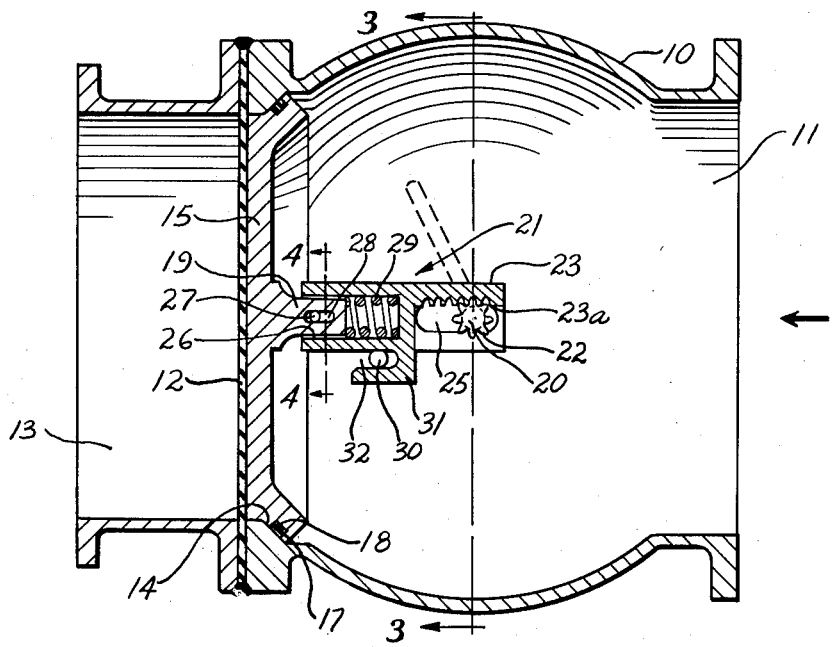
FIGURE 1 is a longitudinal vertical sectional view of a hermetically sealed butterfly-poppet valve constructed in accordance with the invention, showing the movable valve member in closed position.
Figure 3:
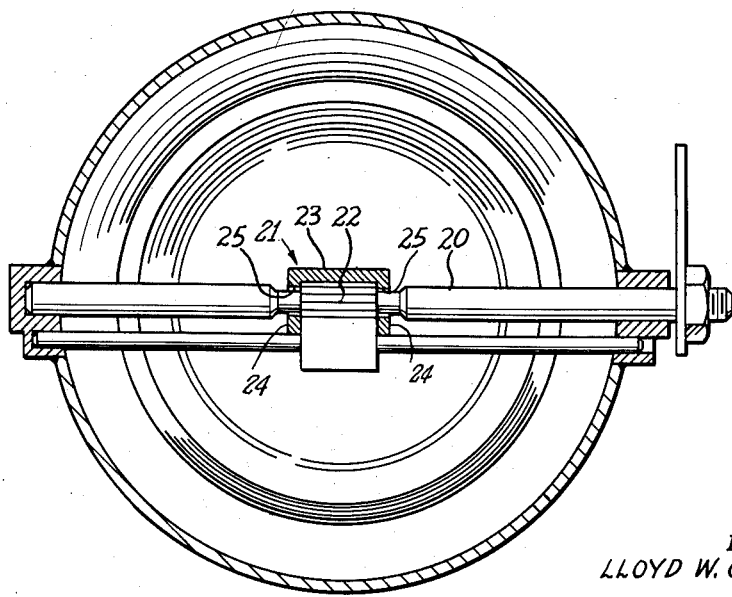
FIGURE 3 is a transverse section on line 3—3 of FIGURE 1.

As an example of one form in which the invention may be embodied, I have shown in the drawings, wherein like reference characters designate corresponding parts in the several views, a hermetically sealed type of butterfly-poppet valve including a valve body 10 having a through flow passage 11. Because it is presently preferred to utilize my improved valve actuating means in connection with a hermetically sealed valve, I have represented a circular shearable hermetic sealing sheet 12 of frangible material as being welded marginally between the outlet, or downstream, end of valve body 10 and a tubular outlet section 13.

Inwardly adjacent to hermetic sealing sheet 12, an annular seat 14 is provided for circular disk-like butterfly-poppet valve member 15. The inwardly presented face of valve seat 14 preferably is upstreamwardly flaring for even contact with the correspondingly tapered downstreamwardly presented face of a marginal flange 16 formed on valve member 15.

Sealing sheet 12 constitutes a hermetic barrier to fluid flow through passage 11 when initially installed and is secured by suitable means such as welding to the flat outer face of valve member 15. As a supplemental non-hermetic seal to serve after hermetic sealing sheet 12 has become broken in the operational use of the valve, a sealing ring 17 is partially recessed in an annular groove 18 provided in the tapered seating face of valve member 15. It is to be understood as being within the scope of the present invention to utilize my improved valve actuating means in connection with a valve that is not hermetically sealed and relies exclusively upon a sealing ring, such as ring 17, for sealing means.

A central inwardly projecting stem 19 is provided on movable valve member 15 for connection to valve actuating means constituted by transverse actuating shaft 20 and a sequential-movement link-arm member 21 that intervenes between said valve stem and shaft.

Actuating shaft 20 extends transversely through the central portion of flow passage 11 and has its ends journaled in the lateral wall of valve body 10 with at least one end exteriorly projecting for application of torque to said shaft by local manipulating means or by remote control means (not shown). A pinion gear 22 is provided centrally on actuating shaft 20 (preferably machined on).

Sequential-movement link-arm member 21 is elongated in form and of comparatively small diameter so that it offers very slight obstruction to fluid flow. At its upstream end, member 21 is of inverted U-shape in cross-section with a top wall 23 and depending parallel side walls 24—24 and has laterally registering longitudinal through slots 25—25 in side walls 24—24 to rotatably and slidably receive actuating shaft 20. A longitudinal toothed rack 23a is provided on the underneath face of top wall 23 in mesh with gear 22 on actuating shaft 20. The length of slots 25—25 is equal to the distance it is desired to move valve member 15 along the axis of valve seat 14 in the linear first stage of movement of said valve member.

The downstream end of link-arm member 21 has a longitudinal socket 26 to slidably receive valve stem 19. A diametrical limiting pin 27 extending transversely through socket 26 penetrates a longitudinal lost-motion slot 28 provided in valve stem 19. Between the inner end of valve stem 19 and the bottom of socket 26, a compression spring 29 is interposed to provide for yielding action of valve member 15 under seating pressure during closing movement thereof.

A transverse stop bar 30 extends from wall to wall through flow passage 11 of valve body 10 directly beneath link-arm member 21 and substantially midway between valve seat 14 and actuating shaft 20. In co-operation with stop bar 30, an L-shaped stop bar guide 31 depends from the underneath face of link-arm member 21 medially of its length to present a downstreamwardly opening guide slot 32 extending longitudinally with respect to said member for slidable reception of stop bar 30.

*Operation*

Assuming that the valve is in closed position with movable valve member 15 in tight contact with its seat 14 and with shearable sealing sheet 12 in its initially intact hermetically sealing condition, sequential-motion link-arm member 21 will extend in dead-center relation to actuating shaft 20 and valve stem 19 in line with the common axis of valve body 10 and valve seat 14, as shown in FIGURE 1. Compression spring 29 will be under maximum tension and pressing valve member 15 tightly against its seat in addition to the force of pressurized fluid in flow passage 11.

Figure 2:
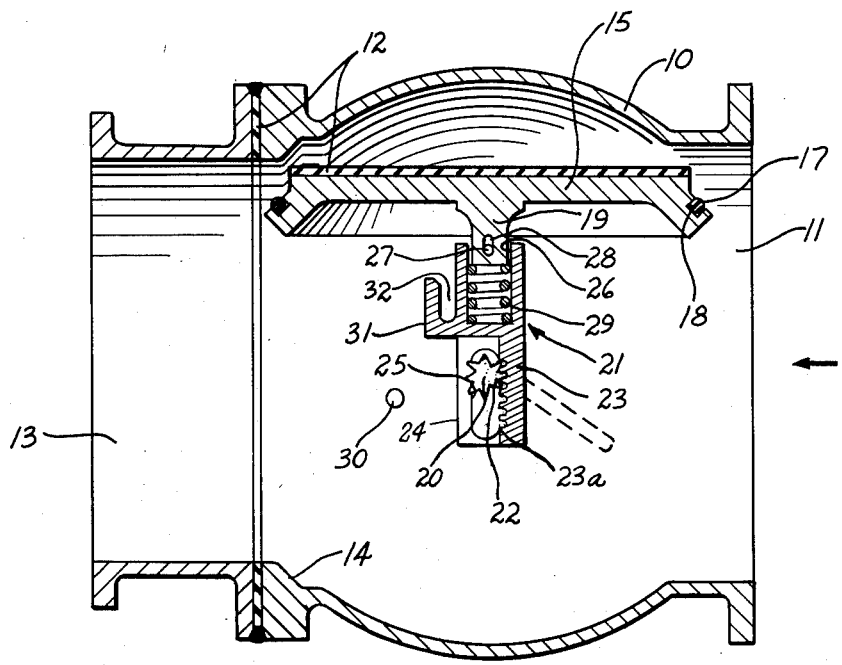
FIGURE 2 is a similar view showing the valve member in fully open position.
Figure 4:
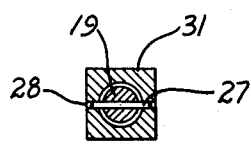
FIGURE 4 is a transverse section on line 4—4 of FIGURE 1.

In order to "crack" the valve or to regulate the size of the annular orifice to varying degrees within the first stage of movement, actuating shaft 20 is rotated clockwise proportionately. This action causes gear 22 of shaft 20 to co-operate with toothed rack 23a to draw link-arm member 21 inward (to the right in FIGURE 1), thereby breaking the hermetic seal and moving valve member 15 away from its seat 14. During this movement, until actuating shaft 20 contacts the inner, or downstreamward, ends, of slots 25—25 and stop bar 30 becomes simultaneously disengaged from guide slot 32, the said guide slot will guide link-arm member 21 in truly rectilinear translation coaxially with respect to valve seat 14. At this point, gear 22 will become locked with rack 23a at the inner end thereof, whereupon link-arm member 21 will become a crank arm and, during continued clockwise rotation of shaft 20, will oscillate in clockwise direction about actuating shaft 20 as a pivot to rotate, or swing, valve member 15 into the fully open position shown in FIGURE 2, which is the second stage movement.

To close the valve, actuating shaft 20 is rotated reversely in counter-clockwise direction, thereby oscillating link-arm member 21 in the same direction until this reverse second stage movement brings the latter into limiting contact with stop bar 30. Immediately thereafter, stop bar 30 will enter guide slot 32 and continued counter-clockwise rotation of actuating shaft 20 will cause gear 22 to co-operate with rack 23a to translate link-arm 21 in reverse first stage movement toward valve seat 14. True linearity of this first stage movement is assured by sliding movement of stop bar 30 in guide groove 32. When valve member 15 contacts valve seat 14, any further downstreamward movement of link-arm member 21 will be cushioned by spring 29. Because hermetic sealing sheet 12 has been broken, only the non-hermetic sealing ring 17 will be effective to seal the valve thereafter.

While there have been shown and described and pointed out the fundamental novel features of this invention as applied to a single structural embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

I claim:

1. A butterfly-poppet valve comprising a valve body having a through flow passage with upstream inlet and downstream outlet, an annular upstreamwardly facing valve seat located in the valve body inwardly adjacent to the outlet, a circular butterfly-poppet valve member movable within the valve body downstreamwardly into closing contact with the valve seat and upstreamwardly into open position, an actuating shaft extending transversely through the valve body upstreamward with respect to the valve seat with its ends journaled in the lateral wall of said valve body and being adapted for application of torque, a sequential-movement link-arm member interconnecting the actuating shaft and movable valve member, the said link-arm member being elongated, straight and slender in form with its downstreamward end rigidly arranged at right angles to the movable valve member and connected thereto for movement therewith, the upstreamward end portion of the link-arm member being of inverted U-shape in cross-section with integral top and depending side walls and having laterally registering through slots extending longitudinally in said depending side walls and terminating short of the ends of said end portion of the link-arm member, a toothed rack extending longitudinally underneath the top wall of said upstreamward end portion of the link-arm member substantially coextensive with the side wall slots thereof, the actuating shaft being arranged to extend through the said side wall slots of the link-arm member for rotation therein and to limit the longitudinal reciprocation of said link-arm member in the valve body, a gear affixed to the actuating shaft and being in mesh with the toothed rack of the link-arm member in a manner to cause first-stage longitudinal reciprocation of said link-arm member during rotation of said shaft in one direction until the downstreamward ends of the side wall slots come into limiting contact with said shaft whereupon the gear will become locked with the toothed rack to cause oscillation of the link-arm as a crank arm and thereby cause second-stage rotation of the movable valve member into parallelism of the plane thereof with the direction of fluid flow in the flow passage of the valve body and whereby reverse rotation of said shaft will cause reverse second-stage rotation of the movable valve member, and means to guide the link-arm member in restriction to axial first-stage linear movement upstreamwardly prior to contact of the actuating shaft with the downstreamward ends of the side wall slots of said link-arm member and to reverse first-stage axial movement downstreamwardly following said contact and intervening second-stage and reverse second-stage oscillation of said link-arm member and supported movable valve member.

2. A butterfly-poppet valve as defined in claim 1, wherein the means to guide the sequential-movement link-arm member in its strictly linear movement includes a stop bar extending transversely across the flow passage of the valve body inwardly adjacent to the movable valve member in laterally offset relation below the longitudinal axis of the latter, and a hook-shaped stop bar guide provided on the underneath face of said link-arm member and being constructed and arranged to present a straight longitudinal guide slot opening toward the movable valve member in a position to slidably engage the stop bar and guide said link-arm member in linear movement, the length of the slot of the stop bar guide being such that said stop bar will clear the open end of said slot when the gear on the actuating shaft has contacted the downstreamward end of the limiting slot, whereby the said link-arm member will be released for oscillatory movement about the axis of the actuating shaft.

References Cited in the file of this patent

UNITED STATES PATENTS

| | | |
|---|---|---|
| 373,000 | Zehren | Nov. 8, 1887 |
| 809,859 | Stulp | Jan. 9, 1906 |
| 923,808 | Breth | June 8, 1909 |
| 1,248,578 | Vuilleumier | Dec. 4, 1917 |
| 1,595,038 | Vencl | Aug. 3, 1926 |
| 2,960,096 | Summers | Nov. 15, 1960 |

FOREIGN PATENTS

| | | |
|---|---|---|
| 405,439 | Great Britain | Feb. 8, 1934 |
| 496,005 | France | July 18, 1919 |